US006904276B1

(12) United States Patent
Freeman et al.

(10) Patent No.: US 6,904,276 B1
(45) Date of Patent: Jun. 7, 2005

(54) APPARATUS AND METHOD FOR MANAGING CALL BILLING RECORDS

(75) Inventors: Michael B. Freeman, Colorado Springs, CO (US); Roland B. Webster, Jackson, MS (US); Michael D. Jarrett, Tulsa, OK (US); Eddie L. Pickeral, Plano, TX (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/464,784

(22) Filed: Dec. 17, 1999

(51) Int. Cl.[7] .............................................. H04M 11/00
(52) U.S. Cl. ...................... 455/406; 455/405; 455/408; 379/114.01
(58) Field of Search ................................ 455/406, 405, 455/403, 557, 414.2, 408, 550.1, 575.1, 407, 410, 411, 507, 456.2, 436, 432.2, 433, 517, 455; 705/40, 34, 30; 709/200, 201, 203, 217, 218; 379/126.01, 115.01–115.03, 114.01, 120, 112, 134, 135, 126, 127, 140, 229, 230, 243; 370/385, 410, 352–563, 466, 467, 522

(56) References Cited

U.S. PATENT DOCUMENTS

| | | | | |
|---|---|---|---|---|
| 5,325,290 A | * | 6/1994 | Cauffman et al. | 364/401 |
| 5,333,183 A | * | 7/1994 | Herbert | 379/112 |
| 5,333,184 A | * | 7/1994 | Doherty et al. | 379/115 |
| 5,481,600 A | * | 1/1996 | Alesio | 379/114.15 |
| 5,699,528 A | * | 12/1997 | Hogan | 395/240 |
| 5,737,399 A | * | 4/1998 | Witzman et al. | 379/112 |
| 5,757,894 A | * | 5/1998 | Kay et al. | 379/127 |
| 5,873,030 A | * | 2/1999 | Mechling et al. | 455/408 |
| 5,898,780 A | * | 4/1999 | Liu et al. | 380/25 |
| 5,920,613 A | * | 7/1999 | Alcott et al. | 379/114 |
| 5,949,875 A | * | 9/1999 | Walker et al. | 380/4 |
| 5,982,865 A | * | 11/1999 | Creamer et al. | 379/116 |
| 5,991,746 A | * | 11/1999 | Wang | 705/40 |
| 6,002,754 A | * | 12/1999 | Jaiswal et al. | 379/144.28 |
| 6,032,132 A | * | 2/2000 | Nelson | 705/34 |
| 6,055,567 A | * | 4/2000 | Ganesan et al. | 709/219 |
| 6,134,307 A | * | 10/2000 | Brouckman et al. | 379/115 |
| 6,304,857 B1 | * | 10/2001 | Heindel et al. | 705/34 |
| 6,317,490 B1 | * | 11/2001 | Cameron et al. | 379/114.01 |

FOREIGN PATENT DOCUMENTS

DE 0 647 055 A * 5/1995 .......... H04M/15/28

* cited by examiner

Primary Examiner—Edward F. Urban
Assistant Examiner—Charles Chow

(57) ABSTRACT

An apparatus is provided for managing call billing records of communications network users. The apparatus includes a communications network, a gateway, a communications link, and a network processor. The communications network is operative to carry user calls. The gateway communicates with the network and is operative to collect call billing data from the network in a first data structure format. The communication link is coupled to the gateway. The network processor communicates with the gateway via the communication link. The network processor is operative to receive the collected call billing data in the first data structure format and convert the collected call billing data from the first data structure format to a second data structure format. A method is also provided.

32 Claims, 2 Drawing Sheets

US 6,904,276 B1

APPARATUS AND METHOD FOR MANAGING CALL BILLING RECORDS

TECHNICAL FIELD

The present invention pertains to telecommunications data networks. More particularly, the present invention relates to the collection, format converting, and routing of call billing records via a network processor directly to a data network for billing purposes.

BACKGROUND OF THE INVENTION

The collection of billing records from communications networks is presently carried out by switches. Individual switches within a telecommunications network, such as a PSTN network, generate billing information that is in a format which is native to the switch. In essence, the switch is used to collect call records by monitoring all the dialog traffic that occurs through the switch. The billing information is then collected from all the switches within the network. However, this billing information is in a non-industry standard format which makes the collection of call billing information from multiple switches difficult and inefficient.

Another problem results from the need to provide expensive switch features, such as switch ports, for Internet service provider (ISP) usage. Typically, Internet service providers (ISPs) do not need expensive switch features. Likewise, Internet service providers (ISPs) often lease co-located modems from local exchange carriers (LECs), either incumbent LECs or competitive LECs. As a result, ISPs use more floor space and spend more money on switching features and co-located modems. Therefore, there was a need to provide for new switches, many of which now present billing data in a non-industry standard format. As a result, there is a further enhanced problem in that the collection of billing information from various switches is now complicated because of such non-industry standard format.

Therefore, there exists a need for improved techniques for collecting call billing information from a telecommunications network.

SUMMARY OF THE INVENTION

A call billing collection apparatus and method uses a local network processor as part of a switched network solution to collect billing records from a signaling gateway, convert the billing records from a raw data structure format to a data format compatible with a data network, and forward the call billing data in the second data structure format to the data network for billing processing.

According to one aspect, an apparatus is provided for managing call billing records of communications network users. The apparatus includes a communications network, a gateway, a communications link, and a network processor. The communications network is operative to carry user calls. The gateway communicates with the network and is operative to collect call billing data from the network in a first data structure format. The communication link is coupled to the gateway. The network processor communicates with the gateway via the communication link. The network processor is operative to receive the collected call billing data in the first data structure format and convert the collected call billing data from the first data structure format to a second data structure format.

According to another aspect, an apparatus is provided for managing call billing records for users of a communications network. The apparatus includes a network, a signaling gateway, a communications link, and a network processor. The network has communications capabilities to carry user calls. The signaling gateway communicates with the network and is operative to collect call billing data resulting from the calls in a first data structure format. The communication link is coupled to the signaling gateway. The network processor communicates with the signaling gateway via the communication link and is operative to convert the collected call billing data from the first data structure format to a second data structure format conducive to conducting billing processing.

According to yet another aspect, a method is provided for managing call billing records of users of a communications network. The method includes: providing a first computer device, a second computer device, and a communication link, the first computer device communicating with the network and the second computer device communicating with the first computer device via the communication link; collecting call billing data with the first computer device in a first data structure format; transferring the call billing data using a data communications protocol from the first computer device to the second computer device; and converting the call billing data with the second computer device from the first data structure format to a second data structure format.

According to even another aspect, a method is provided for managing call billing records generated from usage within a communications network by users. The method includes: providing a signaling gateway communicating with the network and a network processor communicating with the signaling gateway; collecting call billing data with the signaling gateway in a first data structure format; transferring the call billing data using a data communications protocol from the signaling gateway to the network processor; and converting the call billing data with the network processor from the first data structure format to a second data structure format conducive to processing billing information.

One advantage is the ability to provide billing records to a data network in an industry standard format.

Another advantage is the compatibility between the network processor and existing local traffic systems.

DETAILED DESCRIPTION OF THE PREFERRED EMBODIMENTS

The present invention is directed towards a telecommunications call collection apparatus that is able to present billing record data to a data network in a format conducive to processing of billing information. Accordingly, billing records are retrieved from a communications network and converted into another format that is conducive to such processing. According to one implementation, the converted format is a recognized industry standard data format.

Figure 1:
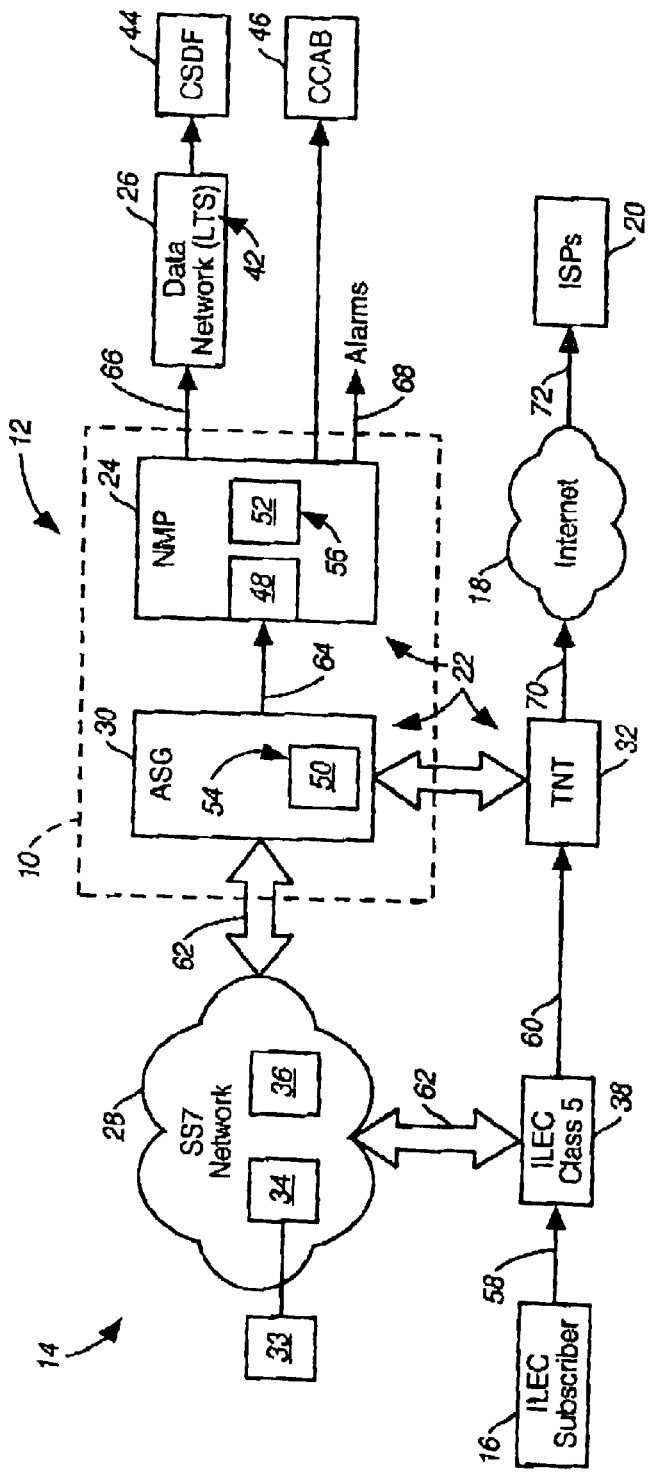
FIG. 1 is a schematic block diagram illustrating the architecture of a telecommunications network capable of benefiting from the apparatus for managing call billing records of Applicant's invention which is described in greater detail with reference to FIGS. 2–3.

FIG. 1 is a schematic block diagram depicting one embodiment of the present invention in the form of a call billing collection apparatus identified by reference numeral 10. Apparatus 10 communicates with a telecommunications network 12 comprising a public switched telephone network (PSTN) 14, one or more subscribers 16, the Internet 18, Internet service providers 20, an integrated access platform 22, a network processor, or platform, 24, and a data network 26.

According to one implementation, PSTN network 14 is a PSTN signaling system 7 (SS7) network 28. SS7 network 28 uses a signaling system referred to as an ITU signaling system 7 (SS7) which is a newer out-of-band signaling system that is being required by many telecommunications administrations worldwide for their networks. ITU (in French) refers to the International Telegraph and Telephone Consultative Committee that approved the ITU SS7 recommendations that have been optimized for digital networks. The resulting protocol uses destination routing, octet oriented fields, variable length messages and a maximum message length allowable for 256 bytes of data.

As shown in FIG. 1, signaling gateway 30 is an Ascend signaling gateway manufactured by Ascend Communications, Inc., of Westford, Mass., recently merged with Lucent Technologies, Inc., of Murray Hill, N.J. Integrated access platform 22 provides call billings record management apparatus and a network access server (TNT) 32, also manufactured by Lucent Technologies, Inc. Apparatus 10 includes signaling gateway 30 and network processor 24.

PSTN SS7 network 28 includes one or more signal transfer points (STPs), such as an incumbent local exchange carrier (ILEC) STP 34 and a network telecommunications services provider STP 36 that is also providing the call billing services of apparatus 10.

Network processor, 24 is configured to provide call collection functionality according to one aspect of Applicant's invention. More particularly, network processor 24 is configured to poll integrated access platform (IAP) 22 every 15 minutes in order to collect call billing records from network 12, in this case, PSTN 14. Network processor 24 then converts the collected call billing records into a Bellcore automatic message accounting (AMA) format, wherein AMA provides an industry-recognized standard for billing information. Network processor 24 then sends the AMA records and audit reports to a data network 26, such as a local traffic system (LTS) 42. LTS 42 then mediates the AMA records, and forwards such records to a corporate system data feed (CSDF) 44. Subsequently, CSDF 44 forwards the AMA records to one or more co-carrier access billing systems (CCABS) 46. CCABS 46 then places the resulting records into its database for settlement with each incumbent local exchange carrier 33 and each internet service provider (ISP) 20.

Accordingly, NP 24 of IAP 22 is configured to collect, convert, and deliver call billing records to LTS 42. NP 24 is provided with an interface 48 that connects with IAP SS7 gateway 30 and enables polling, at preset intervals, to collect raw ASG call event records (CERs) 50. NP 24 is operative to invoke a reformatting process that converts the ASG CERs 50 into a Bellcore AMA format (BAF) 52. BAF 52 records are written and stored at NP 24, then sent to LTS 42 for further billing processing.

ASG CERs 50 provide collected call billing data in a first data structure format 54. Network processor 24 then converts such collected call billing data from first data structure format 54 into BAF 52 which is in a second data structure format 56 that is recognizable by the network processor and readily usable by a data network 26.

Network processor 24 is provided with the following features. First, call billing file collection is carried out from ASG 30 via a data communications protocol. Call billing data is transferred from gateway 30 to network processor 24 using the data communications protocol from gateway 30 to network processor 24. According to one construction, gateway 30 is provided by a first computer device, and network processor 24 is provided by a second computer device. According to one implementation, the data communications protocol is a file transfer protocol (FTP).

Secondly, billing record conversion is carried out from an ASG native format to a Bellcore AMA Structure Code 625 format. Thirdly, call billing is delivered to LTS 42 using the file transfer protocol (FTP). Fourth, network processor 24 implements an audit report that uses a reconciliation technique that tracks the summation of files that are sent to a data network, or a billing system. Network processor 24 sends such files to data network 26. The reconciliation technique comprises a software routine wherein the number of bytes of data is counted, then the counted-up number of records and/or bytes of data are compared to a status file in order to determine when a full, successful transfer has occurred. Furthermore, network processor 24 provides WEB-based audit tool reporting features, and one or more alarm signal reporting to a Tivoli alarm management system, sold by Tivoli Systems, Inc., of Austin, Tex.

According to one implementation, data network 26 is a local traffic system (LTS).

Several benefits are provided by call billings record management apparatus 10, via network processor 24, as follows. First, ASG billing records from SS7 network 28 and network access server 32 are converted into an industry standard AMA format. Second, network processor 24 provides connectivity and billing record data flow capabilities into an existing local traffic system (LTS) 42 presently available from MCI Worldcom having an MCI Worldcom data network frame relay/ATM (not shown). Third, network processor 24 delivers billing traffic to co-carrier access billing systems (CCABs) 46 for settlement. Fourth, network processor 24 is an in-house developed application that is compatible with the MCI Worldcom LTS 42 which facilitates rapid development and deployment within existing MCI Worldcom network environments.

Figure 2:
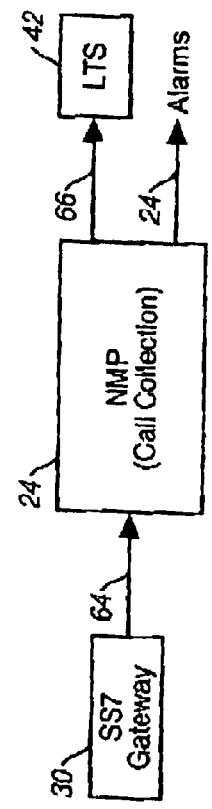
FIG. 2 is a block diagram illustrating a call billing records management apparatus for collecting, converting, and forwarding billing records to a data network for bill processing.

FIG. 2 illustrates an integrated access platform (IAP) network processor (NP) call collection architecture for use with call billings record management apparatus 10 of FIG. 1. More particularly, call processing is carried out between signaling gateway 30 and network processor 24 by implementing call processing at network processor 24. In order to carry out such call processing, the following steps are implemented via network processor 24.

First, network processor 24 polls the raw ASG CERs 50. Then network processor 24 constructs a BAF output file. Subsequently, network processor 24 pushes the BAF data files to LTS 42. Retransmission is then carried out along with re-polling, followed by an archiving/restoration operation. Finally, a call record view is provided for CER data 50 and BAF data 52 (see FIG. 1).

In order for network processor 24 to poll raw ASG CERs 50, network processor 24 implements the following steps.

First, network processor 24 logs in to ASG 30. Subsequently, network processor 24 goes to a call event records (CER) directory. Then network processor 24 transfers the file as text and/or binary files from gateway 30 to network processor 24 at predetermined intervals using a file transfer protocol (FTP). Such transfer, according to one implementation, is carried out at a default setting for the predetermined intervals of 15 minutes. Next, verification is made by network processor 24 that the file transfer has been successful. Subsequently, the ASG file is renamed by the network processor 24. Finally, network processor 24 moves the file to a backup directory.

In order to construct an output file containing the Bellcore AMA format (BAF) data 52 (see FIG. 1), network processor 24 implements several steps. Network processor 24 first converts each file containing Lucent CER data 50 to a file containing BAF data 52 in a BAF 625 format. Additionally, network processor 24 will populate the listed BAF 625 data elements with the following default values:

| (1) | Sensor Type = | 26 |
|---|---|---|
| (2) | Sensor ID = | Initially 1, for first ASG and increments by one for each additional ASG |
| (3) | Recording Office Type = | 26 |
| (4) | Recording Office ID = | Initially 1, for first ASG and increments by one for each additional ASG |

Network processor 24 then prepends the output file containing BAF data 52 with a BAF 9038, logical data set header record which is a specific billing format defined by the Bellcore Automatic Message Accounting (AMA) Format (BAF) Requirement TR#030#NWT-001100. Such format identifies paths according to the resource they are terminated on. Additionally, network processor 24 will populate the BAF 9038 data elements with default values as follows:

(1) AMA Sequence Number=0
(2) Program Generic No.=0
(3) Type of Tracer=28
(4) Header Type=0
(5) Sending Unit Number=0
(6) First Block Sequence Number Furthermore, network processor 24 postpends the BAF output file with a BAF 9039, logical data set trailer record. Additionally, network processor 24 will populate the BAF 9039 data elements with default values as follows:

(1) DCC/APS Program Generic No.=6
(2) Type of Tracer=29
(3) Trailer Type=0
(4) Last Block Sequence Number
(5) Block Count=3

In order to construct the BAF output file, network processor 24 will provide block sequence numbers that will be simulated for the integrated axis platform call collection application of apparatus 10. Network processor 24 will provide a gateway specific running counter of block sequence numbers for each signaling gateway 30 (of FIG. 1) that is polled. The block sequence number will range between 00,000,001 to 99,999,999, where 00000000 is reserved for system restarts. Network processor 24 will increment the block sequence numbers for each block that is created. When the first block's sequence number is greater than the last block's sequence number, the first block shall have a sequence number equal to 1, and the subsequent block numbers will be incremented accordingly. Such event will occur after there has been a system restart, and the network processor 24 reaches 99,999,999 for a block sequence number for any block other than the last block in the file.

Each file that is sent to local traffic system (LTS) 42 by network processor 24 will have the equivalent of three blocks (see FIG. 1). The three blocks are defined as follows:

(1) Logical Data Set Header (Structure Code 9038) record
(2) All the Terminating Access (Structure Code 0625) records
(3) Logical Data Set Trailer (Structure Code 9039) record In order for processor 24 to push IAP BAFs to local traffic system (LTS) 42 (of FIG. 2), the following steps are required. First, network processor 24 logs into LTS 42. Subsequently, network processor 24 uses the default directory. Next, network processor 24 transfers the BAF output file via file transfer protocol (FTP) to local traffic system (LTS) 42 with a temporary file name. Subsequently, network processor 24 verifies that the file transfer has been implemented successfully. Following successful verification, network processor 24 transfers the reconciliation file via file transfer protocol (FTP). Next, network processor 24 verifies that the reconciliation file was received correctly by LTS 42. Finally, network processor 24 renames the BAF output file following the LTS naming conventions.

In order for network processor 24 to provide re-transmission and re-polling, the re-transmission and re-polling is manually initiated via a standard network processor (NP) user interface provided for on-line files. When the files are not on-line, a manually initiated file transfer will be utilized. First, network processor 24 will provide re-polls from on-line ASG files. After performing a re-poll, nework processor 24 will convert the CERs to BAFs and send them to local traffic system (LTS) 42 using the same file names and sequence numbers as the original file. Subsequently, network processor 24 will perform re-transmission to local traffic system (LTS) 42 from locally on-line BAF output files.

In order for network processor 24 to archive and/or restore CER and BAF files, network processor 24 will provide CER and BAF archive capabilities to an Adstar Distributed Storage Management (ADSM) subsystem, and restoration from the ADSM subsystem.

In order for network processor 24 to provide a call record view, network processor 24 provides the call record view for both CERs and BAFs. The user will input a file name in order to open the file. The user will then be able to scroll through the file and view the call records in a user-friendly manner. In order to realize such implementation, a "call search" will be provided therein.

Several interface requirements exist where network processor 24 interfaces with gateway 30 and LTS 42. An interface between gateway 30 and network processor 24 is achieved as follows. First, the ASG CER files containing raw CER data 50 (of FIG. 1) need to be read by network processor 24. Secondly, each read and processed CER file is renamed. Thirdly, the renamed CER files are moved from one directory to a new directory.

With respect to the first step above, network processor 24 will read CER files from signaling gateway 30, here an Ascend Signaling Gateway (ASG), then rename the CER file after processing it. Subsequently, network processor 24 moves the CER file to a backup directory.

In order for network processor 24 to read the ASG CER files, network processor 24 will connect to signaling gateway, Ascend Signaling Gateway (ASG) 30 using internet protocol (IP). Subsequently, the ASG CERs will be file transferred, via file transfer protocol (FTP), from an ASG directory. One suitable ASG directory is "/home/cfgmgr/log/cer."

For the case where multiple ASG multi-stack nodes are running on a given ASG platform, the CER files are located in a specific "cfgmgr", and one exemplary directory location is "/home/cfgmgrN/log/cer", where N specifies a specific instance of the ASG multi-stack node. Within each instance of the ASG multi-stack node, there may be multiple files based on the instances of modem call managers (MCMGRs).

The ASG CER file naming will be mcmgrn-yyyymmddHHMM.dat (file names are case sensitive) where:

| | |
|---|---|
| mcmgr | are the fixed characters "mcmgr" |
| n | is the instance of the Modem Call Manager (range 1–5) |
| — | is the fixed character "–" |
| yyyy | is the file creation year |
| mm | is the file creation month |
| dd | is the file creation day of the month |
| HH | is the file creation hour, based on 24-hour clock |
| MM | is the file creation minute |
| .dat | are the fixed characters ".dat" |

In order to rename process CER files, network processor 24 will rename the CER file on the ASG after verifying that the file transfer has been successful. The file renaming convention will change the file suffix from ".dat" to ".old". However, the remainder of the file name will remain the same. For purposes of uniformity, a renamed file will have the following syntax:

mcmgrn-yyyymmddhhmm.old

In order to move renamed CER files, network processor 24 will move the renamed CER file on the ASG from its current directory into the following subdirectory "/home/cfgmgr/log/cer/cer_bak". For this case, the file and the source directory will be deleted. The subdirectory "cer_bak" will have been created during system configuration.

An interface 66 between network processor 24 and LTS 42 is achieved as follows. First, network processor 24 pushes the BAF output file, containing BAF data 52 to LTS 42 (of FIG. 1). Secondly, network processor 24 sends a reconciliation file after successfully sending each BAF output file to LTS.

At the interface between network processor 24 and LTS 42, network processor 24 will push the BAF output file to local traffic system (LTS) 42 per an ASG poll. For the case where multiple ASGs are implemented, multiple BAF output files will be sent to local traffic system (LTS) 42. According to such implementation, the BAF output file structure will be as follows:

| Structure Code # | Definition |
|---|---|
| 9038 | Logical Data Set Header |
| 625 | Terminating Access Records |
| 9039 | Logical Data Set Trailer |

The BAF output file naming convention will be "miap.nnnn.ccyymmdd.HHMMSS.swid", with file names being case sensitive, where:

| | |
|---|---|
| miap | are the fixed characters "miap" |
| . | is the delimiter character "." |
| nnnn | is the file sequence number assigned by NP having a range 0001–9999. 0000 is reserved for system restarts. The NP will provide an ASG specific running file sequence number for each unique ASG or instance of an ASG. |
| . | is the delimiter character "." |
| ccyy | is the file creation year |
| mm | is the file creation month |
| dd | is the file creation day of the month |
| HH | is the file creation hour, based on 24-hour clock |
| MM | is the file creation minute |
| SS | is the file creation second |
| . | is the delimiter character "." |
| swid | is a five-character ID assigned to each ASG using the syntax cccnn where ccc is a three-character city abbreviation and nn is a two-digit number having a range from 01 to 99. Example switch Ids are irg01, da102, and nyk53. |

It is important to note two things. First, used values are extracted from the ASG CER file name. Secondly, seconds are computed from the date/time of the answer field of the first BAF in the file.

The temporary file naming conventions will prepend "TEMP." to the BAF output file name until the file transfer is successfully validated, and the reconciliation file transfer is validated.

| | |
|---|---|
| nnnn | is the file sequence number assigned by NP having a range 0001–9999. 0000 is reserved for system restarts. The NP will provide an ASG specific running file sequence number for each unique ASG or instance of an ASG. |
| . | is the delimiter character "." |
| ccyy | is the file creation year |
| mm | is the file creation month |
| dd | is the file creation day of the month |
| mm | is the file creation minute |
| ss | is the file creation second |
| . | is the delimiter character "." |
| swid | is a five-character ID assigned to each ASG using the syntax cccnn where ccc is a three-character city abbreviation and nn is a two-digit number having a range from 01 to 99. Example switch Ids are irg01, da102, and nyk53. |

It is important to note two things. First, used values are extracted from the ASG CER file name. Secondly, seconds are computed from the date/time of the answer field of the first BAF in the file.

The temporary file naming conventions will prepend "TEMP." to the BAF output file name until the file transfer is successfully validated, and the reconciliation file transfer is validated.

With respect to the integrated access platform (IAP) reconciliation file, network processor 24 will send a reconciliation file after each BAF output file is successfully sent to local traffic system (LTS) 42. The reconciliation file name according to one implementation is "miap.nnnn.ccyymmddhhmmss.swid.SR.dat".

With respect to the integrated access platform (IAP) reconciliation file, network processor 24 will send a reconciliation file after each BAF output file is successfully sent to local traffic system (LTS) 42. The reconciliation file name according to one implementation is "miap.nnnn.ccyymmddhhmmss.swid. SR.dat", using the same time stamp and sequence number as the BAF output file. The reconciliation file will contain the following data elements:

| Field | Format | Comments & Examples |
|---|---|---|
| Switch ID | Up to 6 alpha-numeric Characters | IRG01, ATLA, BALT22, LOSANG, etc. |
| First block sequence number of the Logical Data Set (LDS) Block | Integer | Taken from the 9038 record |
| Date that First Block was Written to Disk | Char CCYYMMDD | Taken from the 9038 record |
| Time that First Block was Written to Disk | Char HHMMSS | Taken from the 9038 record |
| Last block sequence number of the LDS Block | Integer | Taken from the 9039 record. |
| Date that Last Block was Written to Disk | Char CCYYMMDD | Taken from the 9039 record. |
| Time that Last Block was Written to Disk | Char HHMMSS | Taken from the 9039 record. |
| Number of Records excluding Headers and Trailers | integer | The number of 625 records in the file. |
| Number of Blocks | integer | The MIAP NP file contains 3 blocks. |

As shown in FIG. 2, alarm signals 24 are delivered from network processor 24 to a Tivoli alarm management system. Network processor 24 has multiple levels of alarm classifications. According to one implementation, the range of alarm classifications will be: a) informational, b) minor, c) major, and d) critical. An additional or optional feature consists of enabling the emailing of alarms 24 to additional monitoring systems (not shown). Network processor 24 will generate the following list of alarms, and will deliver them to a Tivoli alarm management system (not shown), such as is provided within several Tivoli Management packages presently sold by Tivoli Systems, Inc., of Austin, Tex.:

1. Duplicate records based on CER sequence number.
2. Missing records based on CER sequence number.
3. Out of Sequence records based on CER sequence number.
4. No data received from any generating system in 6 hours.
5. Port failures.
6. Polling failures by any sending unit.
7. Mass storage/write errors.
8. Program errors.
9. Hardware failures.
10. Archive tape failures.
11. Power off.
12. Mass storage of: 70%, 90%, 100% (default), or "user-set" % for full.
13. Invalid password.
14. File interrupt at sending unit.
15. Time out on data links.
16. Poll queued to invalid port.

Network processor 24 of FIG. 2 is configured to produce reports at preset intervals and on-demand. The user will have options to request that the reports are displayed on a video screen, output to a printer, or emailed. Following are exemplary reports:

1. Daily volume tracking inputs and outputs by structure code, call code, IXC ID code.
2. Hourly volume tracking inputs and outputs by structure code, call code, IXC ID code.
3. Hour-by-hour tracking average based on three previous days' data.
4. Polling schedule report listing session activity for receiving CREs and sending BAFs:
    A) file transfer session start time, initial record sequence number;
    B) file transfer session duration, final record sequence number;
    C) bytes received or sent; and
    D) session status, i.e. successful, aborted, not data available, target system not responding.
5. Alarm report listing the last 1000 alarms by date, time, classification, and description.
6. System performance report over a previous five day window, by day, listing:
    A) records received, records sent;
    B) CPU utilization, disk utilization, communication utilization; and
    C) successful sessions, failed sessions.

System requirements for carrying out one exemplary implementation of the call billings record management system of Applicant's invention entail the following storage requirements, network communications requirements, and processing capabilities. Such exemplary system requirements have been calculated based on the assumption of one Ascend (Lucent) signaling gateway (ASG), configured with 100,000 ports, and rated at 270,000 busy hour call attempts.

For one set of exemplary storage requirements, the network processor 24 (of FIG. 2) will be assumed to retain the CERs and BAFs on-line for 31 days. The resulting storage requirements, for one ASG, are computed as follows:

| | |
|---|---|
| ASG CER = | 92 bytes |
| BAF 625 = | 83 bytes |
| Total bytes per call = | 175 bytes |

Each ASG can process 270 K calls per busy hour. A busy hour is typically 10% of a day's traffic. Therefore, there can be 2.7 million calls per day. The resulting total bytes per day can be calculated, as a result, to be:

175 bytes/call*2.7 million calls/day=472.5 million bytes.

Total storage for 31 days can then be calculated as:

472.5 million bytes/day*31 days=14.65 gigabytes.

Network communications requirements can also be calculated by example. The network communications bandwidth, for one ASG, is calculated based on data transfer during a busy hour. This number is then doubled to account for the busy second using the following algorithm:

Record size (in bits)*# of records in busy hour/3600 seconds/hour*2

(busy second factor)=bits/second+10% for retransmission and miscellaneous overhead.

Input=121 kb/s

Output=109.5 kb/s

Processing capacity requirements for network processor 24 will be sufficiently sized to complete one polling cycle before beginning the next polling cycle. The polling cycle is defined as:

1. Input CERs, convert CERs to BAF, and output the BAF output file.
2. Process and output the IAP reconciliation file, rename the BAF output file.
3. Statistic and peg count accumulation for reporting.
4. Alarm reporting.

Figure 3:
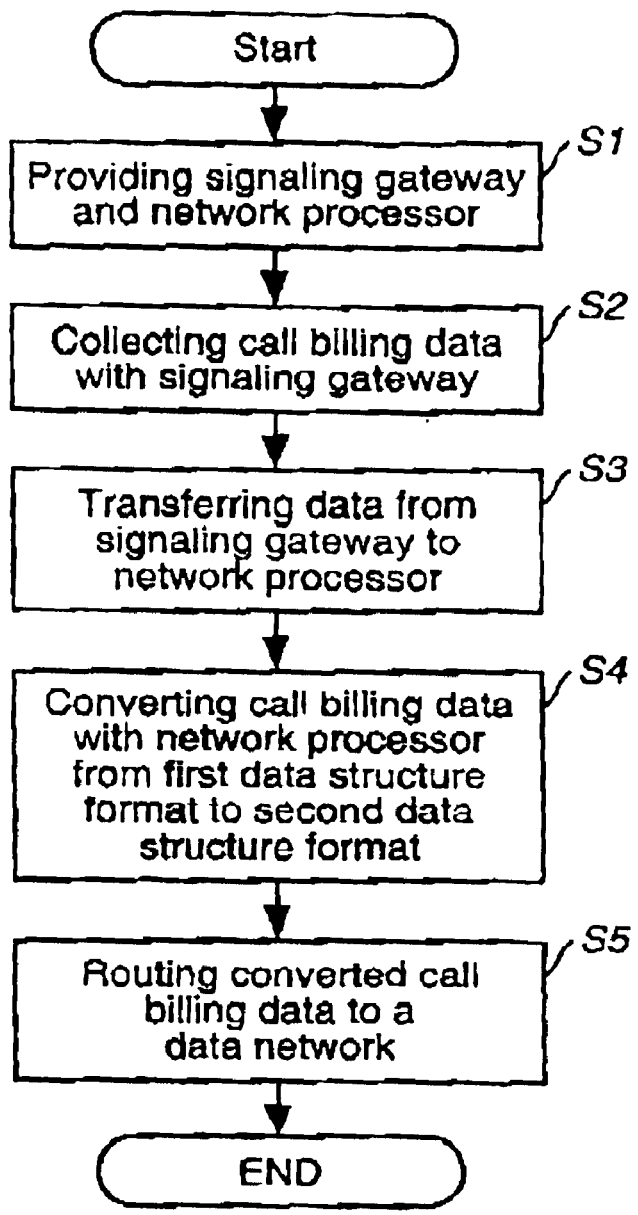
FIG. 3 is a logic flow diagram illustrating the steps involved in implementing Applicant's invention.

FIG. 3 discloses a first level logic flow diagram for the programming of processing circuitry present within apparatus 10, and more specifically, within gateway 30 and network processor 24 (of FIG. 1). The logic flow diagram describes a process that includes logical operations that are implemented by the processing circuitry within the call billings record management apparatus. Furthermore, the logical flow diagram includes steps utilized according to one implementation of Applicants' invention.

In Step "S1", signaling gateway and a network processor are provided in communication therebetween. After performing Step "S1", the process proceeds to Step "S2".

In Step "S2", the process collects call billing data with the signaling gateway in a first data structure format. After performing Step "S2", the process proceeds to Step "S3".

In Step "S3", the process transfers the call billing data using a data communications protocol from the signaling gateway to the network processor After performing Step "S3", the process proceeds to Step "S4".

In Step "S4", the process converts the call billing data with the network processor from the first data structure format to a second data structure format that is conducive to processing billing information. After performing Step "S4", the process proceeds to Step "S5".

In Step "S5", the process routes call billing data, or data records, for a user via the network processor to a data network. It is understood that Step "S5" is an optional step. After performing Step "S5", the process terminates.

The protection sought is not to be limited to the disclosed embodiments, which are given by way of example only, but instead is to be limited only by the scope of the appended claims as properly interpreted in accordance with the doctrine of equivalents.

What is claimed is:

1. An apparatus for managing call billing records for users of a signaling network operative to carry user calls, comprising:
   a gateway interfacing the signaling network with an Internet Service Provider and a local exchange carrier and operative to collect call billing data from the signaling network in a first data structure format; and
   a network processor operative to:
   receive the collected call billing data in the first data structure format from the gateway,
   convert the collected call billing data from the first data structure format to a second data structure format,
   access a directory of call event records associated with the call billing data in the first data structure within the gateway;
   generate an output file representing the call billing data in the second data structure based on the call event records, wherein the second data structure includes default values for header fields and trailer fields; and
   transmit the output file to a data network for billing processing by a co-carrier access billing system for settlement with the Internet Service Provider and the local exchange carrier.

2. The apparatus of claim 1 wherein the gateway comprises a signaling gateway.

3. The apparatus of claim 1 wherein the network processor comprises an interface that mates with a communication link coupled to the gateway.

4. The apparatus of claim 1 wherein the network processor is further operative to poll the gateway to collect the collected call billing data in the first data structure format.

5. The apparatus of claim 1 wherein the second data structure format comprises data in a Bellcore automatic message accounting (AMA) format.

6. The apparatus of claim 1 wherein the data network is configured to periodically receive the call billing data in the second data structure format for billing processing.

7. The apparatus of claim 6 wherein the data network comprises a local traffic system (LTS), and wherein the second data structure format comprises an industry standard automatic message accounting (AMA) format.

8. The apparatus of claim 1 wherein the network processor comprises a network platform.

9. The apparatus of claim 1 wherein the local exchange carrier comprises an incumbent local exchange carrier.

10. The apparatus of claim 1, wherein the network processor is further operative to:
    maintain a counter of block sequence numbers for the gateway, wherein the default values of the header fields and the trailer fields include, respectively, the block sequence numbers to specify a first and last block in the output file.

11. A system for managing call billing records for users of a signaling network, comprising:
    a signaling network having communications capabilities to carry user calls;
    a signaling gateway interfacing the signaling network with an Internet Service Provider and a local exchange carrier and operative to collect call billing data resulting from the calls in a first data structure format;
    a communication link coupled to the signaling gateway, and a network processor communicating with the signaling gateway via the communication link and with a data network and operative to:
    convert the collected call billing data from the first data structure format to a second data structure format conducive to conducting billing processing;
    access a directory of call event records associated with the call billing data in the first data structure;
    generate an output file representing the call billing data in the second data structure based on the call event records, wherein the second data structure includes default values for header fields and trailer fields; and
    transmit the output file to the data network for billing processing by a co-carrier access billing system for settlement with the Internet Service Provider and the local exchange carrier.

12. The system of claim 11 wherein the data network is operative to periodically receive the call billing data in the second data structure format for billing processing.

13. The system of claim 11 wherein the network processor is operative to poll the gateway to collect the collected call billing data in the first data structure format.

14. The system of claim 13 wherein the network processor is operative to poll the gateway at preset intervals.

15. The system of claim 11 wherein the data network is configured to receive the call billing data in the second data structure format for billing processing.

16. The system of claim 15 wherein the data network comprises a local traffic system (LTS), and wherein the received call billing data in the second data structure format comprises an industry standard automatic message account (AMA) structure code 625 format that is used to implement billing processing.

17. The apparatus of claim 11 wherein the network processor includes an interface coupled with the communication link operative to mate the network processor with the signaling gateway.

18. The system of claim 11 wherein the local exchange carrier comprises an incumbent local exchange carrier.

19. A method of managing call billing records of users of a signaling network operative to carry user calls, comprising:

collecting call billing data with the first computer device in a first data structure format at a first computer device, said first computer device interfacing the signaling network with an Internet Service Provider and a local exchange carrier;

transferring the call billing data from the first computer device to a second computer device;

converting the call billing data at the second computer device from the first data structure format to a second data structure format;

accessing a directory of call event records associated with the call billing data in the first data structure;

generating an output file representing the call billing data in the second data structure based on the call event records, wherein the second data structure includes default values for header fields and trailer fields; and transmitting the output file to a data network for billing processing by a co-carrier access billing system for settlement with the Internet Service Provider and the local exchange carrier.

20. The method of claim 19 wherein the first computing device includes a signaling gateway.

21. The method of claim 19 wherein the second computer device includes a network processor.

22. The method of claim 19 wherein the step of transferring includes transferring the call billing data in accordance with a file transfer protocol.

23. The method of claim 19 wherein the step of transferring includes transferring the call billing data over a communication link provided between the first computer device and the second computer device.

24. The method of claim 19 wherein the local exchange carrier comprises an incumbent local exchange carrier.

25. The method of claim 19, further comprising:

maintaining a counter of block sequence numbers for the first computer device, wherein the default values of the header fields and the trailer fields include, respectively, the block sequence numbers to specify a first and last block in the output file.

26. A method of managing call billing records generated from usage within a signaling network by users, comprising:

collecting call billing data with a signaling gateway in a first data structure format, said signaling gateway interfacing the signaling network with an Internet Service Provider and a local exchange carrier;

transferring the call billing data from the signaling gateway to a network processor;

converting the call billing data with the network processor from the first data structure format to a second data structure format conducive to processing billing information;

accessing a directory of call event records associated with the call billing data in the first data structure format;

generating an output file representing the call billing data in the second data structure based on the call event records, wherein the second data structure format includes default values for header fields and trailer fields; and transmitting the output file to a data network for billing processing by a co-carrier access billing system for settlement with the Internet Service Provider and the local exchange carrier.

27. The method of claim 26 further comprising routing call billing data for a user via the network processor to a data network.

28. The method of claim 26 further comprising generating an invoice from the data network for delivery to individual users.

29. The method of claim 26 wherein the step of transferring includes transferring the call billing data using a file transfer protocol.

30. The method of claim 26 wherein the step of transferring includes transferring the call billing data via a communication link between the signaling gateway and the network processor.

31. The method of claim 26 further comprising generating an alarm signal with the network processor.

32. The method of claim 26 wherein the local exchange carrier comprises an incumbent local exchange carrier.

* * * * *